US012756481B2

(12) United States Patent
Mao et al.

(10) Patent No.: US 12,756,481 B2
(45) Date of Patent: Oct. 6, 2026

(54) MULTI-CHANNEL ANALOG-SIGNAL-INPUT TO DIGITAL-SIGNAL-OUTPUT DOWN-CONVERSION AND DIGITAL-SIGNAL-INPUT TO ANALOG-SIGNAL-OUTPUT UP-CONVERSION PHOTONICS MICROWAVE SYSTEMS BASED ON QUANTUM DOT MULTI-WAVELENGTH LASERS

(71) Applicant: National Research Council of Canada, Ottawa (CA)

(72) Inventors: Youxin Mao, Ottawa (CA); Zhenguo Lu, Ottawa (CA); Khan Zeb, Gatineau (CA); Jiaren Liu, Ottawa (CA); Guocheng Liu, Ottawa (CA); Philip Poole, Ottawa (CA)

( * ) Notice: Subject to any disclaimer, the term of this patent is extended or adjusted under 35 U.S.C. 154(b) by 209 days.

(21) Appl. No.: 18/841,283

(22) PCT Filed: Feb. 24, 2023

(86) PCT No.: PCT/CA2023/050240
§ 371 (c)(1),
(2) Date: Aug. 23, 2024

(87) PCT Pub. No.: WO2023/159320
PCT Pub. Date: Aug. 31, 2023

(65) Prior Publication Data

US 2025/0175258 A1 May 29, 2025

(30) Foreign Application Priority Data

Feb. 24, 2022 (CA) ................................ CA 3151006

(51) Int. Cl.
*H04B 10/00* (2013.01)
*H04B 10/50* (2013.01)
(Continued)

(52) U.S. Cl.
CPC ........... *H04B 10/70* (2013.01); *H04B 10/503* (2013.01); *H04B 2210/006* (2013.01)

(58) Field of Classification Search
CPC .............. H04B 10/503; H04B 10/2575; H04B 10/676; H04B 2210/006; G02F 2/002; G02F 2/004
See application file for complete search history.

(56) References Cited

U.S. PATENT DOCUMENTS 7,769,062 B2 8/2010 Lu et al.
7,991,023 B2 8/2011 Liu et al.
(Continued)

OTHER PUBLICATIONS

Browning, C., et al. "Gain-switched optical frequency combs for future mobile radio-over-fiber millimeter-wave systems." Journal of Lightwave Technology 36.19 (2018): 4602-4610.
(Continued)

*Primary Examiner* — Daniel G Dobson
(74) *Attorney, Agent, or Firm* — Aird & Berlis LLP

(57) ABSTRACT

Methods and systems for down-conversion of high frequency signals in millimeter-wave (mm-wave) communications and for up-conversion of high frequency signals in millimeter-wave (mm-wave) communications. A quantum dot multi-wavelength laser (QD MWL) source generates an optical signal comprising of a plurality of optical channels and allows flexible selection of the optical channels which can be used to generate and process RF signals in higher frequency bands of mm-wave spectrum including K-band, Ka-band V-band, W-band encompassing all 3GPP NR FR2 bands and even THz range depending on the channel spacing.

8 Claims, 4 Drawing Sheets

10

(51) Int. Cl.
*H04B 10/70* (2013.01)
*H04J 14/00* (2006.01)

(56) References Cited

U.S. PATENT DOCUMENTS

| | | | | |
|---|---|---|---|---|
| 10,707,647 | B2 | 7/2020 | Lu et al. | |
| 11,990,944 | B1 * | 5/2024 | Zhang | H01S 5/1096 |
| 2022/0221715 | A1 | 7/2022 | Rahim et al. | |
| 2025/0278011 | A1 * | 9/2025 | Esman | G02F 7/00 |

OTHER PUBLICATIONS

Fan, L., et al. "High-purity 60GHz band millimeter-wave generation based on optically injected semiconductor laser under subharmonic microwave modulation." Optics Express 24.16 (2016): 18252-18265.
Balakier, K., et al. "Monolithically integrated optical phase lock loop for microwave photonics." Journal of Lightwave Technology 32.20 (2014): 3893-3900.
Lu, Z. G., et al. "High performance InAs/InP quantum dot 34.462-GHz C-band coherent comb laser module." Optics Express 26.2 (2018): 2160-2167.
Lu, Z. G., et al. "Ultra-narrow linewidth quantum dot coherent comb lasers with self-injection feedback locking." Optics Express 26.9 (2018): 11909-11914.
Rahim, M., et al. "Monolithic InAs/InP quantum dash dual-wavelength DFB laser with ultra-low noise common cavity modes for millimeter-wave applications." Optics Express 27.24 (2019): 35368-35375.
Kodheli, O., et al. "Satellite communications in the new space era: A survey and future challenges." IEEE Communications Surveys & Tutorials 23.1 (2020): 70-109.
Zhang, L., et al. "A survey on 5G millimeter wave communications for UAV-assisted wireless networks." IEEE Access 7 (2019): 117460-117504.
Yao, J. "Microwave photonics." Journal Of Lightwave Technology 27.3 (2009): 314-335.
Tang, Z., and Pan, S. "Reconfigurable microwave photonic mixer with minimized path separation and large suppression of mixing spurs." Optics Letters 42.1 (2016): 33-36.
Jiang, T., et al. "Microwave photonic phase-tunable mixer." Optics Express 25.4 (2017): 4519-4527.
Pagán, V.R., and Murphy, T. E. "Electro-optic millimeter-wave harmonic downconversion and vector demodulation using cascaded phase modulation and optical filtering." Optics Letters 40.11 (2015): 2481-2484.
Lee, J-Y., and Song, J-I. "Photonic frequency down-converter based on a frequency-doubling OEO using two cascaded EAMs." IEEE Photonics Technology Letters 29.18 (2017): 1529-1532.
Xu, X., et al. "Broadband and wide-range feedback tuning scheme for phase-locked loop stabilization of tunable optoelectronic oscillators." Optics Letters 40.24 (2015): 5858-5861.
Lu, Z. G., et al. "312-fs pulse generation from a passive C-band InAs/InP quantum dot mode-locked laser." Optics Express 16.14 (2008): 10835-10840.
Liu, J., et al. " 1.6-□m Multiwavelength Emission of an InAs—InGaAsP Quantum-Dot Laser." IEEE Photonics Technology Letters 20.2 (2007): 81-83.
Liu, J., et al. "Uniform 90-channel multiwavelength InAs/InGaAsP quantum dot laser." Electronics Letters—IEE 43.8 (2007): 458.
Lu, Z. G., et al. "An L-band monolithic InAs/InP quantum dot mode-locked laser with femtosecond pulses." Optics Express 17.16 (2009): 13609-13614.
Liu, J., et al. "Dual-wavelength 92.5 GHz self-mode-locked InP-based quantum dot laser." Optics Letters 33.15 (2008): 1702-1704.
Jiao, Z., et al. "Tunable terahertz beat signal generation from an InAs/InP quantum-dot mode-locked laser combined with external-cavity." IEEE Photonics Technology Letters 24.6 (2012): 518-520.
Liu, J., et al. "THz optical pulses from a coupled-cavity quantum-dot laser." Optics Communications 285.6 (2012): 1323-1325.
Lu, Z. G., et al. "Ultra-high repetition rate InAs/InP quantum dot mode-locked lasers." Optics Communications 284.9 (2011): 2323-2326.
Mao, Y., et al. "Ultra-low timing jitter of quantum dash semiconductor comb lasers with self-injection feedback locking." IEEE Journal of Selected Topics in Quantum Electronics 25.6 (2019): 1-7.
Zeb, K., et al. "Photonic generation of spectrally pure millimeter-wave signals for 5G applications." 2019 International Topical Meeting on Microwave Photonics (MWP). IEEE, 2019.
Mao, Y., et al. "Pulse timing jitter estimated from optical phase noise in mode-locked semiconductor quantum dash lasers." Journal of Lightwave Technology 38.17 (2020): 4787-4793.
Zeb, K., et al. "Broadband optical heterodyne millimeter-wave-over-fiber wireless links based on a quantum dash dual-wavelength DFB laser." Journal of Lightwave Technology 40.12 (2022): 3698-3708.
Zeb, K., et al. "InAs/InP quantum dash buried heterostructure mode-locked laser for high capacity fiber-wireless integrated 5G new radio fronthaul systems." Optics Express 29.11 (2021): 16164-16174.
Hua, B., et al. "Advances in Photonics Assisted Terahertz Wireless Communication System." 2021 19th International Conference on Optical Communications and Networks (ICOCN). IEEE, 2021.
Lu, Z., et al. "InAs/InP quantum dash semiconductor coherent comb lasers and their applications in optical networks." Journal of Lightwave Technology 39.12 (2021): 3751-3760.
Lu, Z., et al. "Quantum dash multi-wavelength lasers for Tbit/s coherent communications and 5G wireless networks." Journal of the European Optical Society-Rapid Publications 17 (2021): 1-7.
Poole, P.J., et al. "A performance comparison between quantum dash and quantum well Fabry-Perot lasers." IEEE Journal of Quantum Electronics 57.6 (2021): 1-7.
Zhang, H., et al. "Quantum dot coherent comb laser source for converged optical-wireless access networks." IEEE Photonics Journal 13.3 (2021): 1-9.
International Search Report issued in International Application No. PCT/CA2023/050240, May 9, 2023, 2 pages.
Written Opinion of the International Searching Authority issued in International Application No. PCT/CA2023/050240, May 9, 2023, 5 pages.

* cited by examiner

10

30

60

90

200

MULTI-CHANNEL ANALOG-SIGNAL-INPUT TO DIGITAL-SIGNAL-OUTPUT DOWN-CONVERSION AND DIGITAL-SIGNAL-INPUT TO ANALOG-SIGNAL-OUTPUT UP-CONVERSION PHOTONICS MICROWAVE SYSTEMS BASED ON QUANTUM DOT MULTI-WAVELENGTH LASERS

FIELD

Aspects of the disclosure relate to methods and systems for multi-channel analog-signal-input to digital-signal-output down-conversion and digital-signal-input to analog-signal-output up-conversion photonics microwave systems using quantum dot multi-wavelength lasers (MWLs).

BACKGROUND

Traditional electronic systems and techniques are foreseen to struggle with the ultra-high millimeter-wave (30 GHz to 300 GHz) carrier frequencies and wide-bandwidth requirements of emerging technologies, such as terrestrial 5G/6G wireless and next-generation satellite communications. Specifically, analog-to-digital conversion (ADC) and digital-to-analog conversion (DAC) electronic systems pose a major bottleneck in processing such high-frequency and wide-bandwidth signals. Towards this, microwave photonics offers many competitive advantages for processing ultra-high frequency signals, including large bandwidth, high isolation, and strong immunity to electromagnetic interference. Thus, microwave photonic systems are considered a promising solution to meet the ever-increasing demands for improved processing speed and performance, and reduced system complexity. However, for high quality signals, microwave photonics relies on spectrally pure optical sources. Therefore, photonic generation and processing of mm-wave signals require highly coherent and ultra-low noise optical sources. To this end, QD MWLs offer many distinctive advantages for photonic generation and processing high-frequency carriers with high spectral purity from 5 GHz up to THz, easing the high-frequency requirement on electronic ADC/DAC systems. The advantages include ultra-narrow optical linewidth, very low relative intensity noise, ultra-low timing jitters, compact size, low power consumption, simple fabrication, and the ability to integrate with silicon or other platforms in a hybrid configuration [1-4].

The trend in 5G and beyond wireless networks and future satellite communication systems is to employ increasingly powerful digital payloads for antenna beam forming and switching. One of the consequences of this trend is that there is a strong push in 5G wireless networks and satellite communication payload and antennas design towards digital signal processing in the millimeter-wave (MMW) (30 GHz to 300 GHz) range. This has a direct impact on the analog to digital converter (ADC)/digital to analog converter (DAC) design as conversion bandwidth is limited. Traditional electronic techniques are predicted to struggle with the high carrier frequency and wide bandwidth requirements of the above-mentioned emerging applications. Accordingly, there is a need for new technology capable of overcoming many of the limitations in traditional electronic ADCs/DACs.

MMW frequency conversion for signal transmission and processing is a key block in 5G and beyond wireless networks and future satellite communication systems [5, 6]. As compared with electrical approaches that are subjected to electrical bandwidth bottleneck, photonic microwave frequency converters may offer many competitive advantages including large bandwidth, high isolation, and strong immunity to electromagnetic interference. As such, photonic microwave frequency converters are promising solutions to meet with the ever-increasing demands for improved processing speed and performance [7]. Generally, photonic microwave frequency converters are achieved by modulating the incoming microwave, mm-wave or radio frequency (RF) signals onto optical carriers for translating them into optical domain and then mixing them with optical local oscillators (LOs) on photodetectors to produce target intermediate frequency (IF) or baseband signals. Similarly, baseband or IF signals are translated into optical domain by modulating optical carriers and then the desired RF microwave/mm-wave carrier frequency signals are synthesized optically. Many approaches to implement photonic microwave frequency converters have been put forth, including those based on cascaded or parallel intensity modulators [8, 9] and phase modulators [10]. Unfortunately, these state-of-the-art frequency converters face limitations brought about by the external electrical LO sources, which suffer from the significantly increased cost and size for multi-stage frequency multiplication and the greatly degraded spectral purity at MMW frequency range, thus facing huge challenges to operate at high frequencies greater than 30 GHz. While optoelectronic oscillators can address some of these limitations [11], they are still subjected to the limited operational bandwidth caused by the electrical components (e.g., electrical amplifiers and narrow-band filters) and bulky system size involving fibre spools [12].

SUMMARY

In one of its aspects, a method for high RF frequency conversion for a communication system comprising millimeter-waves (mm-waves), the method comprising the steps of:

with a quantum dot multi-wavelength laser (QD MWL) source, generating at least one optical signal comprising of a plurality of optical channels;

selecting the at least two optical channels comprising a first optical channel and a second optical channel, wherein the second optical channel is at least one local oscillator (LO) signal;

modulating the first optical channel with at least one digital data signal having a predetermined baud rate and generating at least one modulated optical signal;

multiplexing the at least one modulated optical signal and the second optical channel to generate a multiplexed optical signal containing the at least one data and the at least one local oscillator (LO) signal;

beating the at least one modulated data signal and the at least one local oscillator (LO) signal on at least one first photodetector to generate at least one radio frequency (RF) signal;

amplifying the at least one radio frequency (RF) signal;

transmitting the at least one radio frequency (RF) signal;

whereby the least one data signal is up-converted into at least one least one radio frequency (RF) signal.

In another of its aspects, a method for down-conversion of high frequency signals for a communication system comprising millimeter-waves (mm-waves), the method comprising the steps of with a quantum dot millimeter-wave laser (QD MWL) source, generating at least one optical signal comprising of a plurality of optical channels;

selecting the at least two optical channels comprising a first optical channel and a second optical channel; wherein the second optical channel is at least one local oscillator signal;

modulating the first optical channel with an incoming radio frequency signal having a first high frequency (GHz) and generating at least one modulated optical signal;

beating the at least one modulated optical signal with the second optical channel to generate an IF or baseband signal;

converting the IF or baseband signal into a first electrical signal having a first frequency; and converting the first electrical signal with the first frequency into a second electrical signal having a second frequency, wherein the first frequency is greater than the second frequency, wherein the second frequency is within the processing bandwidth of a traditional analog to digital converter (ADC);

the analog to digital converter (ADC) for receiving and converting the second electrical signal into a digital signal;

processing the digital signal to generate a digital output; whereby the least one high frequency RF signal is down-converted into the digital signal.

In another of its aspects, a photonic down-conversion system for high frequency communications, such as millimeter-wave (mm-wave) communication, the up-conversion system comprising:

a quantum dot multi-wavelength laser (QD MWL) source for generating at least one optical signal comprising a plurality of optical channels;

a demultiplexer for selecting at least two optical channels comprising a first optical channel and a second optical channel; wherein the second optical channel is at least one local oscillator signal;

an optical modulator for modulating the first optical channel with an incoming radio frequency signal having a first high frequency (GHz) and generating at least one modulated optical signal;

a multiplexer for combining the at least one modulated optical signal with the second optical channel;

at least one photodetector for beating the at least one modulated optical signal with the second optical channel baseband signal to generate an IF or baseband signal being a first electrical signal having a first frequency;

an analog to digital converter and a digital signal processing system (DSP) for converting the first electrical signal with the first frequency into a second electrical signal having a second frequency, wherein the first frequency is greater than the second frequency, wherein the second frequency is within the processing bandwidth of a traditional analog to digital converter (ADC);

converting the second electrical signal into a digital signal; and processing the digital signal to generate a digital output; whereby the least one high frequency RF signal is down-converted into the digital signal.

In another of its aspects, a photonic up-conversion system for high frequency communications, such as millimeter-wave (mm-wave) communication, the up-conversion system comprising:

a quantum dot multi-wavelength laser (QD MWL) source for generating at least one optical signal comprising of a plurality of optical channels;

a demultiplexer selecting the at least two optical channels comprising a first optical channel and a second optical channel; wherein the second optical channel is at least one local oscillator signal;

a modulator for modulating the first optical channel with a digital signal having a predetermined baud rate and generating at least one modulated optical signal;

a multiplexer for multiplexing the at least one modulated optical signal and the second optical channel to generate a multiplexed optical signal containing data and LO signals;

at least one first photodetector for beating the at least one modulated data signal and the at least one local oscillator signal to generate at least one radio frequency (RF) signal;

an amplifier for amplifying the at least one radio frequency (RF) signal;

at least one antenna for transmitting the at least one radio frequency (RF) signal; whereby the least one data signal is up-converted into an RF signal.

The quantum dot/dash (QD) multi-wavelength lasers (MWLs) [13-17] can offer many distinctive advantages to perform as an equivalent LO sources of generating high-frequency electrical signals ranging from 10 GHz up to 1000 GHz [18-20] for photonic microwave frequency down- and up-converters. The wide range comb spacing from 10 GHz up to 1000 GHz [18-20] also enables an ultra-broad bandwidth for photonic microwave frequency conversion. The QD MWLs have been shown great potential as an efficient optical beat sources for MMW signals generation with high spectral purity and tenability due to the inherent characteristics of QD materials because our QD MWLs have ultra-narrow optical spectral linewidths, very low relative intensity noise (RIN) and ultra-low timing jitters [21-26]. Other advantages of the QD MWLs include compact size, low power consumption, simple fabrication, and the ability for hybrid integration with silicon substrates.

Advantageously, the methods and systems disclosed herein achieve multi-channel analog-signal-input to digital-signal-output down-conversion and digital-signal-input to analog-signal-output up-conversion photonics microwave systems by using quantum dot multi-wavelength lasers, and may be useful for 5G & beyond wireless networks and future satellite communication systems. Compared with the current state-of-the-art technology, these systems significantly reduce bandwidth requirement, system size, cost, and power consumption.

BRIEF DESCRIPTION OF THE DRAWINGS

Several exemplary embodiments of the present disclosure will now be described, by way of example only, with reference to the appended drawings in which.

DETAILED DESCRIPTION

Figure 1A:
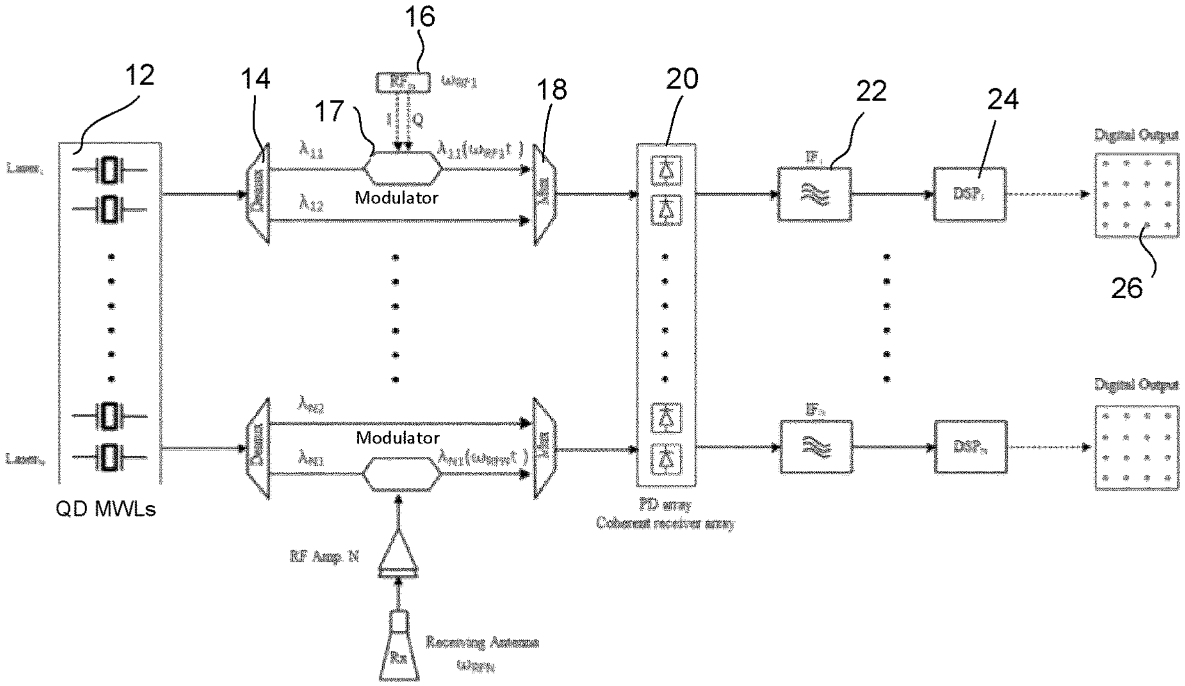
FIG. 1*a* is an overview of a multi-channel analog-signal-input to digital-signal-output down-conversion photonics microwave system based on quantum dot multi-wavelength lasers, in one example.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Down Conversion

Looking at Figure T a, there is shown a high-level overview of a millimeter-wave (mm-wave) communication system 10 comprising a photonic microwave down-converter. The mm-wave communication system 10 comprises a QD MWL source 12 for generating an optical signal; a demultiplexer 14 for selecting at least two optical channels comprising a first optical channel and a second optical channel; wherein the second optical channel is at least one local oscillator signal; an optical modulator 16 for modulating a radio frequency signal having a first frequency (GHz) with the first split signal to generate a modulated optical signal; an amplifier for boosting the amplitude of the modulated optical signal; a multiplexer 18 for combining the modulated optical signal and the second split signal to generate a multiplexed optical signal; a photodetector 20 for generating a first electrical signal comprising I and Q baseband signals comprising a first frequency converting from the multiplexed optical signal. Filter 22 removes other frequency components of the detected signal and an upconverter converts the first electrical signal into a second electrical signal having a second frequency, wherein the first frequency is greater than the second frequency. An analog to digital converter converts the IF or baseband signal into a digital signal; and a digital signal processing system 24 demodulates the digital signal to generate a digital output 26, such that the least one high frequency RF signal is down-converted into the digital signal. In this case, the down-conversion from multi-analog-signal-input with higher frequency to multi-digital-signal-output with lower frequency is realized.

Figure 1B:
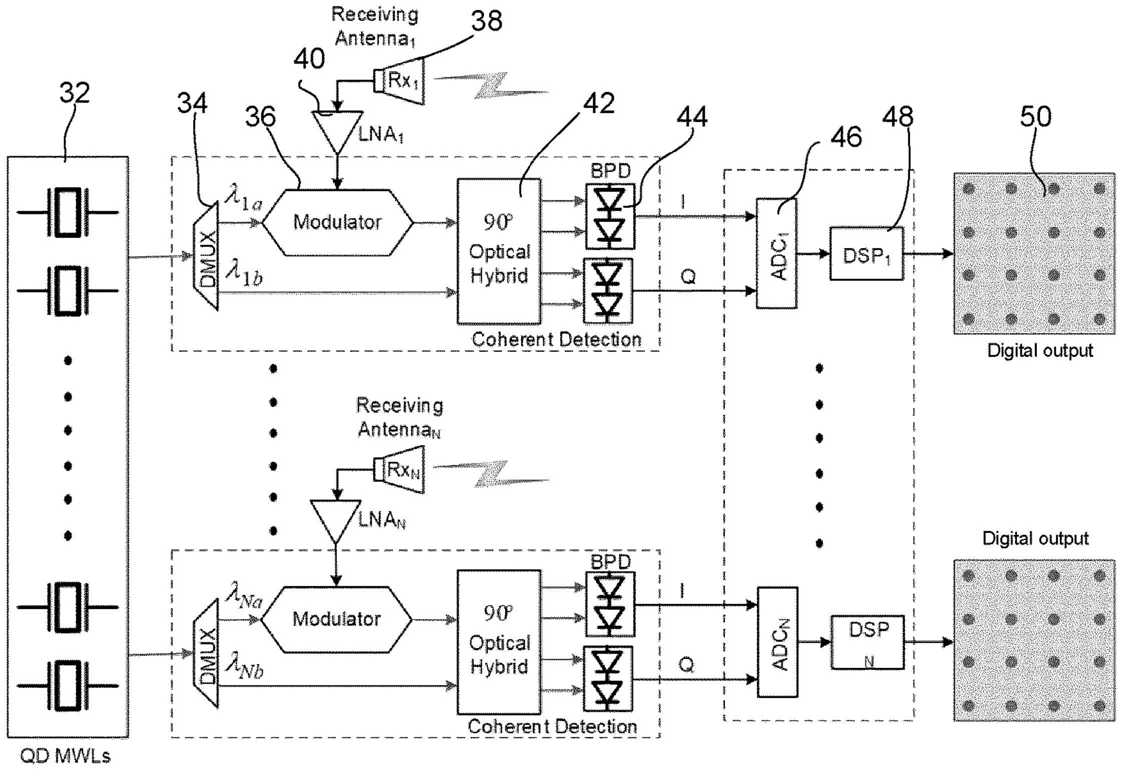
FIG. 1*b* shows the multi-channel analog-signal-input to digital-signal-output down-conversion photonics microwave system of FIG. 1*a* in more detail.

Referring to FIG. 1*b*, there is shown a multi-channel analog-signal-input to digital-signal-output down-conversion photonics microwave system 30 of FIG. 1*a* in more detail. Similar to the millimeter-wave (mm-wave) communication system 30 comprises a QD MWL source 32 for generating an optical signal; a demultiplexer 34 selecting at least two optical channels comprising a first optical channel and a second optical channel, wherein the second optical channel is at least one local oscillator signal is used as a local oscillator (LO); an optical modulator 36 for modulating a radio frequency signal from an antenna 38 and amplified by low noise amplifier 40, with the first split signal to generate a modulated optical signal. As such, the first split signal is used to modulate the incoming RF high frequency signal in order to translate it to the optical domain for processing and then a side band closest to the LO depending on the desired down-converting signal is selected. A 90° optical hybrid 42 and photodetector 44 coherently down-converts the received high frequency RF signals at the antenna 38 directly into their I & Q components. An analog to digital converter 46 converts the IF or baseband signal into a digital signal; and a digital signal processing system 48 demodulates the digital signal to generate a digital output 50, such that the least one high frequency RF signal is down-converted into the digital signal. Similar to system 10, the down-conversion from multi-analog-signal-input with higher frequency to multi-digital-signal-output with lower frequency is realized. Accordingly, the signal may be down converted coherently either to IF or baseband I &Q components, with the aid of electrical low or band pass filters.

Figure 1C:
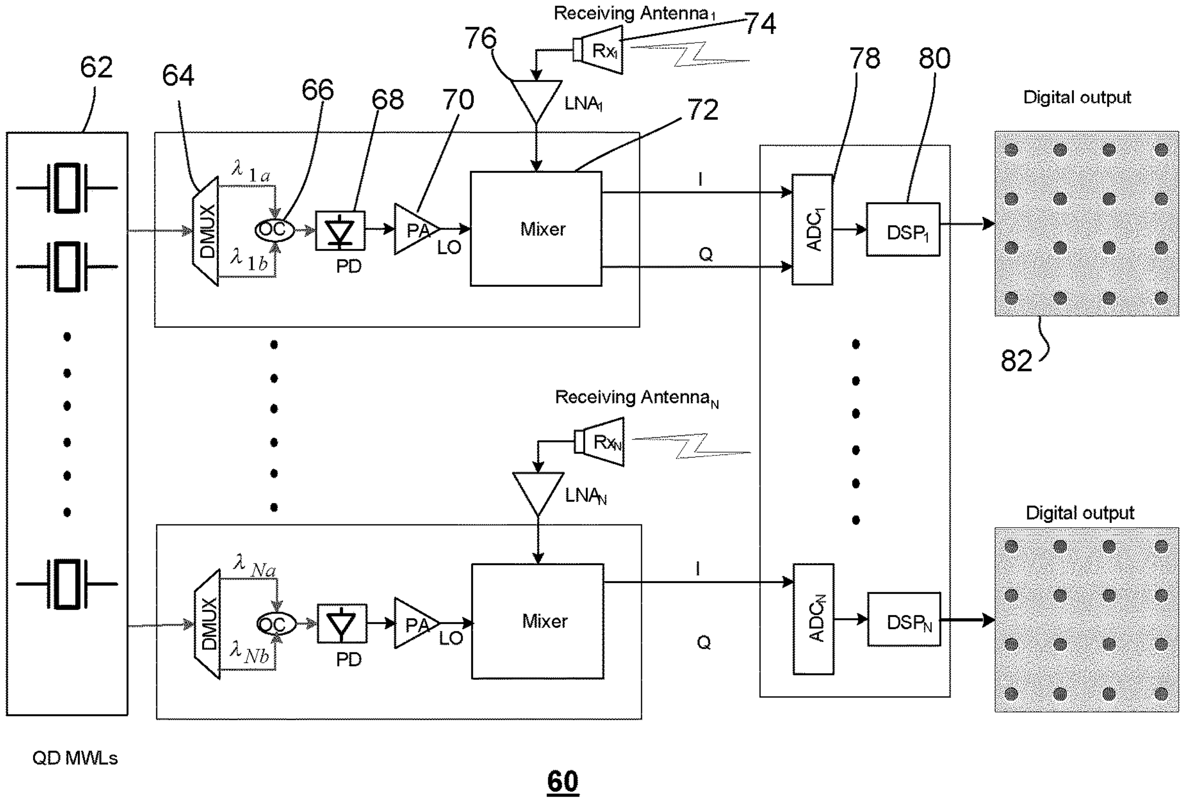
FIG. 1*c* shows a multi-channel analog-signal-input to digital-signal-output down-conversion photonics microwave system based on quantum dot multi-wavelength lasers, in another example.

FIG. 1*c* shows another example of a multi-channel analog-signal-input to digital-signal-output down-conversion photonics microwave system 60 based on quantum dot multi-wavelength lasers. A RF LO signal at the desired frequency is generated using QD-MWLs 62 for the down conversion of the incoming RF signal received by antenna 64 and amplified by low noise amplifier 66. This RF LO is then mixed with the incoming high frequency RF signal in an electrical IQ mixer 68 to down convert the incoming signal to baseband I &Q components, as shown in an experimental demo example. Depending on application, a similar laser source can be used both for up/down conversion as shown in the experimental demonstration as an example for dual-wavelength laser implementation. Accordingly, in some scenarios, the same laser's two optical channels can be used to generate the RF LO required to down-convert the modulated signal generated by the same optical channels. In other cases, similar laser source could be used on the receiving end, for instance in the case of satellite station receiving end.

Figure 2:
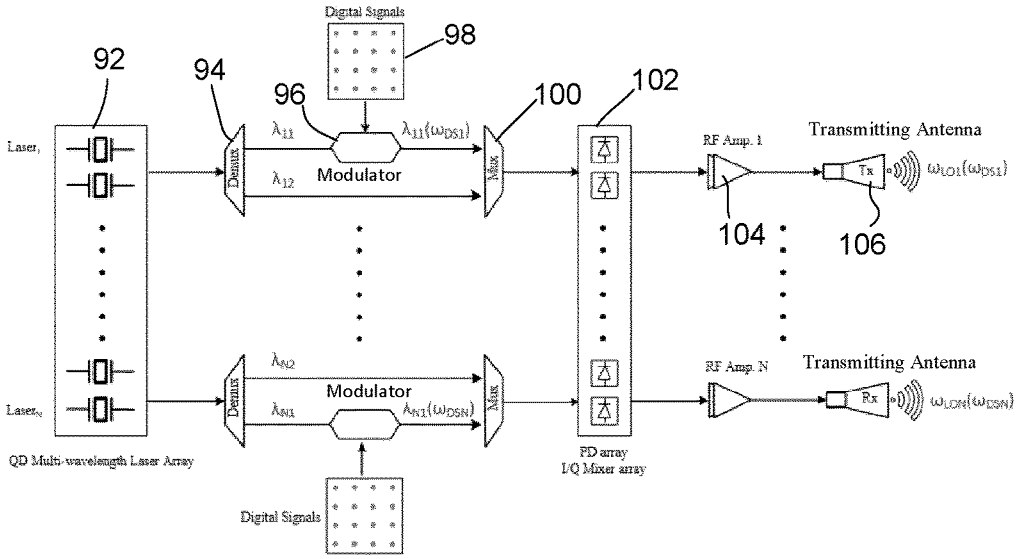
FIG. 2 shows a multi-digital-signal-input and multi-analog-signal-output photonics microwave up-conversion based on quantum dot multi-wavelength lasers, in one example.

Up Conversion:

Looking at FIG. 2, there is shown a high-level overview of a millimeter-wave (mm-wave) communication system 90 comprising a photonic microwave upconverter. The millimeter-wave (mm-wave) communication system 30 comprises a QD MWL source 32 for generating MMW optical signals; a demultiplexer/optical coupler 94 for selecting an optical signal into a first split signal comprising a first wavelength and a second split signal comprising a second wavelength; an optical modulator 96 for modulating the first split signal with a digital baseband or IF signal 98 with a predetermined symbol rate e.g. 800 MBaud, and generating a modulated optical signal; a multiplexer 100 for combining the modulated optical signal and the second split signal to generate a multiplexed data signal; one or more photodetectors 102 for converting the multiplexed data signal to generate a radio frequency signal. The system 10 also comprises an upconverter for converting the electrical signal having the first frequency (GHz) into a second electrical signal having a second frequency, wherein the second frequency is greater than the first frequency; and an amplifier 104 for boosting the amplitude of the second electrical signal, a transmission antenna 106 for transmits the boosted radio signal, whereby the least one data signal is up-converted into a high frequency RF signal. In this case, the up-conversion from multi-analog-signal-input with lower frequency to multi-digital-signal-output with higher frequency is realized.

Figure 3:
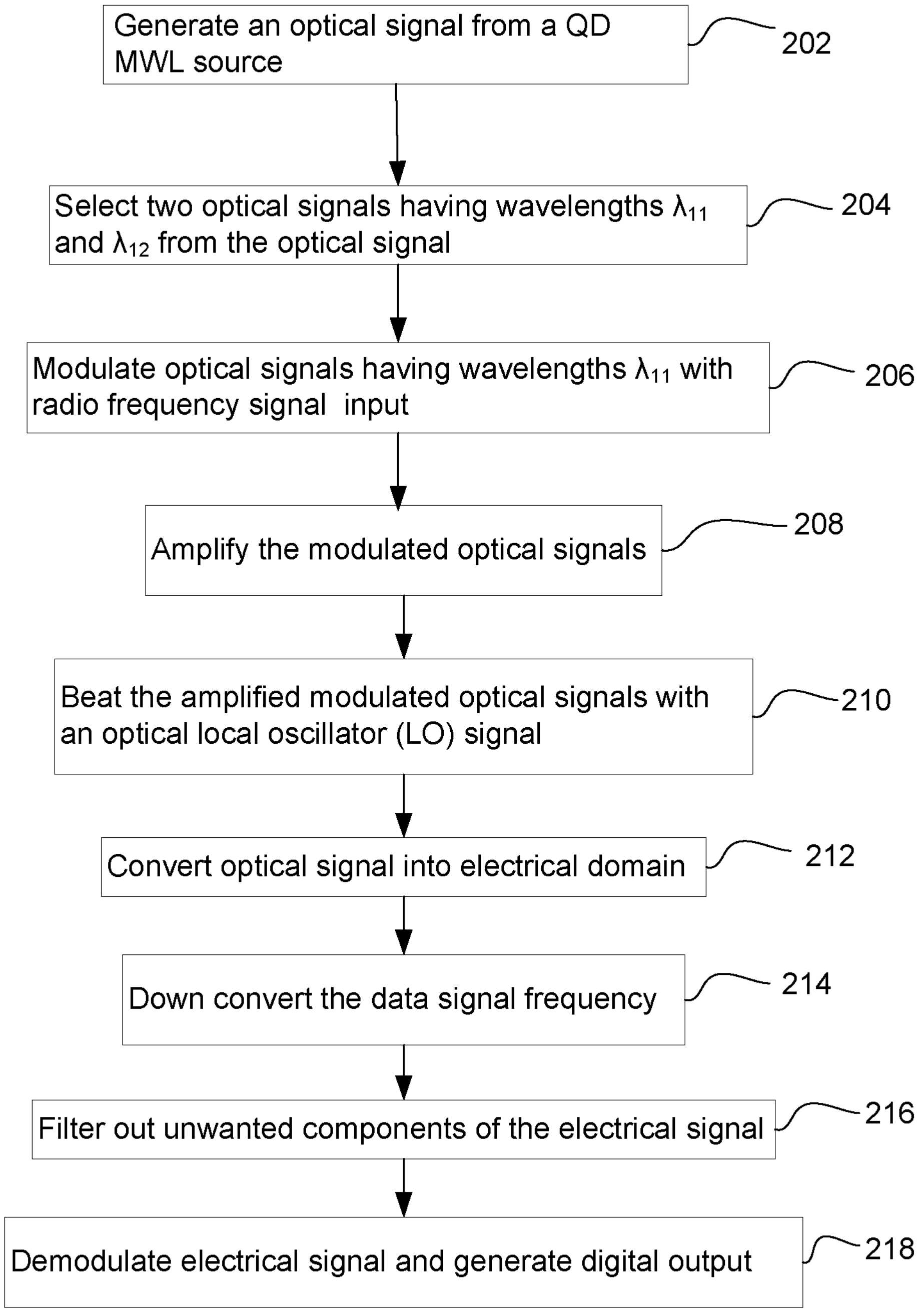
FIG. 3 shows a flow chart outlining exemplary steps for down-conversion from multi-analog-signal-input with higher frequency to multi-digital-signal-output with lower frequency.

FIG. 3 shows a flow chart 200 outlining exemplary steps for down-conversion from multi-analog-signal-input with higher frequency to multi-digital-signal-output with lower frequency, with reference to Figure Ta.

In step 202, a demultiplexer 14 selects two optical channels with first two wavelengths $\lambda_{11}$ and $\lambda_{12}$ from an optical signal obtained from the QD MWL 12 (step 204), and assuming these optical fields comprise the same amplitude $E_0$, for example, then:

$$E_{11} = E_0 e^{j\omega 11t} \tag{1}$$

$$E_{12} = E_0^{ej(\omega 11 + \Delta\omega)t} \tag{2}$$

where, $\omega_{11}$ and $(\omega_{11}+\Delta\omega)$ are the angular frequencies of the light wave of the first two optical comb lines, $\Delta\omega$ denotes the angular frequency interval separating them, i.e. the repetition rate of the QD MWL laser 12. In step 206, the $E_{11}$ comb line is then modulated by an RF input $\gamma\cos(\omega RFt)$ from a radio frequency source 16 via a modulator 17, such as a Mach-Zehnder modulator (MZM), to produce an optical field given by:

$$E_{11MOD} = 1/2 E_0 e^{j\omega 11t}\left\{e^{j[\phi + \gamma cos(\omega RFt)}\right)\} \tag{3}$$

where, $\varphi=\pi V_{dc}/V_\pi$ is the phase shift induced by the DC bias voltage Vdc applied to the MZM 17 with $V_\pi$ denoting the half-wave voltage of the MZM 17, $\gamma=\pi V_{RF}/V_\pi$ is the modulation index, and $V_{RF}$ and $\omega_{RF}$ are the amplitudes and frequency of the RF signal, respectively.

The modulated optical signals $E_{11MOD}$ are then amplified (step 208), and then in step 210 the amplified modulated optical signals are beat with the optical field $E_{12}$, on a photodetector (PD) 20 and converted into electrical domain (step 212). The output electrical field is given by:

$$E_{PD} = \sqrt{1/2} E_{11OD} + j\sqrt{1/2} E_{12LO} \tag{4}$$

Then the current of the photodetector (PD) 20 can be expressed as:

$$I_{PD} = E_{PD} E_{PD} *= (1/2)[E11_{MOD} + jE_{12LO}][E_{11MOD} * - jE_{12LO} *] \tag{5}$$

By using the Bessel function expansion under small-signal modulation:

$$e^{j\gamma\cos\theta} = J_0(\gamma) + jJ_1(\gamma)\left[e^{j\theta} + e^{-j\theta}\right] \tag{6}$$

where $J_n$, n=0, 1, denotes the first two orders of Bessel function of the first kind. Then the AC term of the detected signal is given by:

$$I_{PD} = (1/2)E_0^2[J_0(\gamma)\sin\phi\cos(\Delta\omega t) + J_1(\gamma)\cos\phi\cos(\omega RF + \Delta\omega)t + J_1(\gamma)\cos\phi\cos(\omega RF - \Delta\omega)t] \tag{7}$$

As reflected by the above equation, by adjusting the phase shift $\varphi=\pi Vdc/V\pi$, i.e. changing the DC bias voltage Vdc applied to the MZM 17 in each section MZM from 1 to N, photonic multi-channel analog-signal-input to digital-signal-output down-conversion and digital-signal-input to analog-signal-output up-conversion photonics microwave systems can be achieved by using quantum dot multi-wavelength lasers (a QD mode-locked laser with at least 48 channels with N=24 sections or N QD dual-wavelength DFB lasers) as shown in FIGS. 1*a* and 2.

For example, when $\phi$=o or $\pi$, the frequency component amplitude of $\Delta\omega$ is fully eliminated. The detected signal comprises ($\omega$RF+$\Delta\omega$) and ($\omega$RF-$\Delta\omega$) two frequency components. Assuming the data frequency of an analog-signal-input to MZM is $\omega$RF, which usually is high, for example 47 GHz, when the same $\Delta\omega$=47 GHz QD mode-locked laser 12 is used and the odd channels as the data signal transmission carrier which is input to the MZM 17 and modulated by the RF input $\gamma\cos(\omega RFt)$ via MZM, the modulated frequency is higher. Each of the even channels, as LOs, is combined with the corresponding modulated carrier signal, and then beat with each other. After the PD 20, as from Eq. (7), in step 214 the data signal frequency is down-converted from 47 GHz to ($\omega$RF−$\Delta\omega$)=0 GHz (baseband signal). The other component of ($\omega$RF+$\Delta\omega$)=94 GHz frequency is filtered out by a conventional low-pass filter 22 (step 216). Next, a digital signal processing system 24 demodulates the digital signal to generate a digital output 26 (step 218). Accordingly, in this case, the down-conversion from multi-analog-signal-input with higher frequency to multi-digital-signal-output with lower frequency is realized.

On the other hand, from Eq. (7), when $\phi=\pi/2$, the signal with $\Delta\omega$ frequency component is the largest amplitude. Meanwhile, the unwanted frequency components at ($\omega$RF+$\Delta\omega$) and ($\omega$RF−$\Delta\omega$) are fully eliminated. The detected signal contains only $\Delta\omega$ frequency component. Assume data frequency of a digital-signal-input to MZM is $\omega$RF=4 GHz, which usually less than 5 GHz. When a $\Delta\omega$=47 GHz QD mode-locked laser is used and the odd channels as the data signal transmission carrier which is input to the MZM and modulated by the RF input $\gamma\cos(\omega RFt)$ via MZM. Each of the even channels as optical LOs combines to each corresponded modulated carrier signal, then beating each other. After PD, as from Eq. (7), the data signal frequency is up-converted from 4 GHz to $\Delta\omega$=47 GHz, which means the up-conversion from multi-digital-signal-input with lower frequency to multi-analog-signal-output with higher frequency is realized, as shown in FIG. 2.

Figure 4:
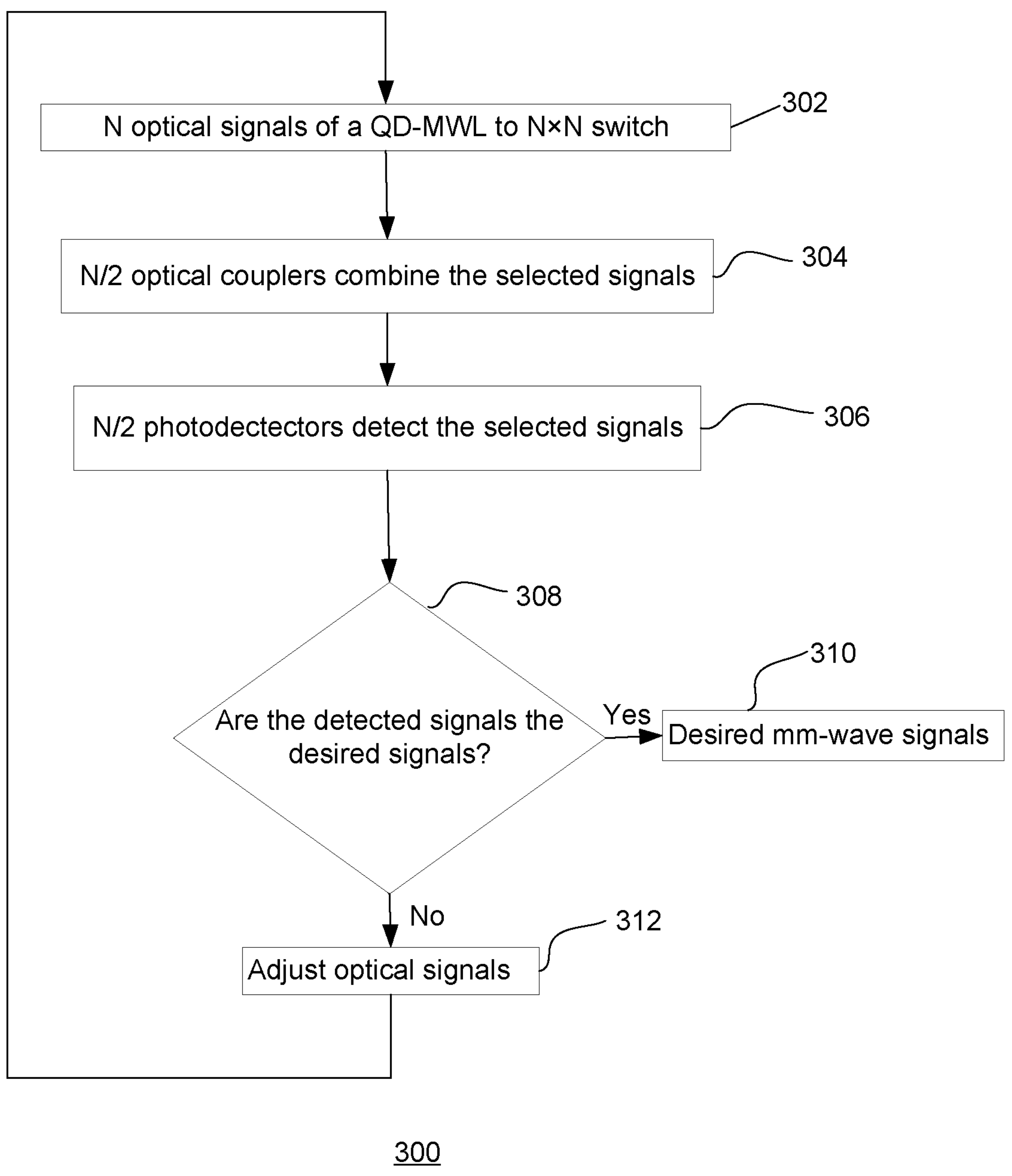
FIG. 4 shows a flow chart outlining exemplary steps for up-conversion from multi-analog-signal-input with higher frequency to multi-digital-signal-output with lower frequency.

In one example, a reconfigurable photonic integrated system for tunable multiband MMW signals generation is developed using QD-MWL-based coherent frequency comb (CFC). The system is based on a programmable specialized wavelength selective switch, arrayed waveguide gratings and/or tunable filters along with optical couplers and an array of photodetectors depending on the system configuration. Accordingly, the system can be dynamically configured through software control where a pair of optical channels of the QD-MWL will be selected, amplified and outputted as an optical heterodyne signal to a photodetector for desired mm-wave frequency. The device allows simultaneous tuning of multiple MMW frequency bands. FIG. 4 shows a flow chart 300 outlining exemplary steps outlining exemplary steps of a process of a device generating MMW frequency tones based on optical signals from a single PML QD-MWL. In step 302, N optical signals of a QD-MWL to N×N switch; in step 304 N/2 optical couplers combine the selected signals; in step 306 N/2 photodectectors detect the selected signals; in step 308, a determination is made whether the detected signals are the desired signals, and if true the desired signals are outputted (step 310), otherwise the optical signals are adjusted and the process returns to step 302.

Accordingly, the QD MWLs (QD dual-wavelength DFB lasers or QD multi-wavelength coherent comb lasers) may be used to achieve the functionalities of multi-analog-signal-input to multi-digital-signal-output and multi-digital-signal-input to multi-analog-signal-output photonics microwave down- and up-conversion based on quantum dot multi-wavelength lasers for 5G and beyond wireless networks and future satellite communication systems.

Therefore, by using a QD MWL or N QD dual-wavelength DFB lasers combining with conventional WDM technology, it is possible to achieve multi-analog-signal-input to multi-digital-signal-output down-conversion and multi-digital-signal-input to multi-analog-signal-output photonics microwave up-conversion system for 5G and beyond wireless networks and future satellite communication systems. Furthermore, it should be noteworthy that the QD MWL is a promising source since the selection of the optical channels is flexible and it can be used to generate and process RF signals in higher frequency bands of mm-wave spectrum including K-band, Ka-band V-band, W-band encompassing all 3GPP NR FR2 bands and even THz range depending on the channel spacing.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Accordingly, the above description of example implementations does not define or constrain this disclosure. Other changes, substitutions, and alterations are also possible without departing from the spirit and scope of this disclosure.

REFERENCES

[1] Z. G. Lu, J. R. Liu, C. Y. Song, J. Webber, Y. Mao, S. D. Chang, H. P. Ding, P. J. Poole, P. J. Barrios, D. Poitras, S. Janz, et. al., "High performance InAs/inP quantum dot 34.462-GHz C-band coherent comb laser module," Optics Express 26 (2), 2160-2167 (January 2018).

[2] Z. G. Lu, J. R. Liu, P. J. Poole, C. Y. Song, and S. D. Chang, "Ultra-narrow linewidth quantum dot coherent comb lasers with self-injection feedback locking," Optics Express 26 (9), 11909-11914 (April 2018).

[3] K. Zeb, Z. Lu, J. Liu, Y. Mao, G. Liu, P, J. Poole, M. Rahim, G. Pakulski, P. Barrios, M. Vachon, D. Poitras, W. Jiang, J. Weber, X. Zhang, and J. Yao, "Broadband optical heterodyne millimeter wave-over-fiber wireless links based on a quantum dash dual-wavelength DFB laser," IEEE/Optica Journal of Lightwave Technology, Vol. 40, no. 12, pp. 3698-3708, February 2022.

[4] K. Zeb, Z. Lu, J. Liu, Y. Mao, G. Liu, P. J. Poole, M. Rahim, G. Pakulski, P. Barrios, W. Jiang, and X. Zhang, "InAs/InP quantum dash buried heterostructure mode-locked laser for high capacity fiber-wireless integrated 5G new radio fronthaul systems," Opt. Express, vol. 29, no. 11, pp. 16164-16174, May 2021.

[5]. Oltjon Kodheli, Eva Lagunas, Nicola Maturo, Shree Krishna Sharma, Bhavani Shankar, Jesus Fabian Mendoza Montoya, Juan Carlos Merlano Duncan, Danilo Spano, Symeon Chatzinotas, Steven Kisseleff, Jorge Querol, Lei Lei, Thang X. Vu, and George Goussetis, "Satellite Communications in the New Space Era: A Survey and Future Challenges", pp. 1-45 (Mar. 2, 2020).

[6]. Long Zhang, Hui Zhao, Shuai Hou, Zhen Zhao, Haitao Xu, Xiaobo Wu, Qiwu Wu, and Ronghui Zhang, "A Survey on 5G Millimeter Wave Communications for UAV-Assisted Wireless Networks," IEEE ACCESS, pp. 1-42 (July 2019).

[7]. J. P. Yao, "Microwave photonics," *J. Lightw. Technol.*, vol. 27, no. 3, pp. 314-335, January 2009.

[8]. Z. Z. Tang and S. L. Pan, "Reconfigurable microwave photonic frequency converter with minimized path separation and large suppression of mixing spurs," *Opt. Lett.*, vol. 42, no. 1, pp. 33-36, January 2017.

[9]. T. W. Jiang, R. H. Wu, S. Yu, D. S. Wang, and W. Y. Gu, "Microwave photonic phase-tunable frequency converter," *Opt. Express*, vol. 25, no. 4, pp. 4519-4527, February 2017.

[10]. V. R. Pagan and T. E. Murphy, "Electro-optic millimeter-wave harmonic down conversion and vector demodulation using cascaded phase modulation and optical filtering," *Opt. Lett.*, vol. 40, no. 11, pp. 2481-2484, June 2015.

[11] J. Y. Lee and J. I. Song, "Photonic frequency down-converter based on a frequency-doubling OEO using two cascaded EAMs," *IEEE Photon. Technol. Lett.*, vol. 29, no. 18, pp. 1529-1532, September 2017.

[12] X. Xu et al., "Broadband and wide-range feedback tuning scheme for phase-locked loop stabilization of tunable optoelectronic oscillators," *Opt. Lett.*, vol. 40, no. 24, pp. 5858-5861, December 2015.

[13]. Z. G. Lu, J. R. Liu, S. Raymond, P. J. Poole, P. J. Barrios, and D. Poitras, "312-fs pulse generation from a passive C-band InAs/InP quantum dot mode-locked laser," Optics Express 16 (14), 10835-10840 (July 2008).

[14]. J. R. Liu, Z. G. Lu, S. Raymond, P. J. Poole, P. J. Barrios, and D. Poitras, "1.6-μm multiwavelength emission of an InAs/InGaAsP quantum dot laser," IEEE Photonics Technology Letters, 20, No. 2, pp. 81-83 (January 2008).

[15]. J. R. Liu, Z. G. Lu, S. Raymond, P. J. Poole, P. J. Barrios, G. Pakulski, D. Poitras, G. Z. Xiao, and Z. Y. Zhang, "Uniform 90-channel multiwavelength InAs/InGaAsP quantum dot laser," Electron. Lett., 43, 8, 458-460 (April 2007).

[16]. Z. G. Lu, J. R. Liu, P. J. Poole, S. Raymond, P. J. Barrios, D. Poitras, G. Pakulski, P. Grant and D. Roy-Guay, "An L-band monolithic InAs/InP quantum dot mode-locked laser with femtosecond pulses," Optics Express, Vol. 17, No. 16, pp. 13609-13614 (August, 2009).

[17]. J. R. Liu, Z. G. Lu, S. Raymond, P. J. Poole, P. J. Barrios, and D. Poitras, "Dual-wavelength 92.5 GHz self-mode-locked InP-based quantum dot laser," Optics Letters, Vol. 33, No. 15, pp. 1702-1704 (August 2008).

[18]. Z. J. Jiao, J. R. Liu, Z. G. Lu, X. P. Zhang, P. J. Poole, P. J. Barrios, D. Poitras, and J. Caballero, "Tunable Terahertz Beat Signal Generation From an InAs/InP Quantum-Dot Mode-Locked Laser Combined With External-Cavity," IEEE Photonics Technol. Lett., vol. 24, No. 6, pp. 518-520, (March 2012).

[19]. J. R. Liu, Z. G. Lu, P. J. Poole, P. J. Barrios, D. Poitras, Z. J. Jiao, and X. P. Zhang, "THz optical pulses from a coupled-cavity quantum-dot laser." Optics Communications, Vol. 285, No. 6, pp. 1323-1325 (March 2012).

[20]. Z. G. Lu, J. R. Liu, P. J. Poole, Z. J. Jiao, P. J. Barrios, D. Poitras, J. Caballero, and X. P. Zhang, "Ultra-high repetition rate InAs/InP quantum dot mode-locked lasers," Optics Communications, Vol. 284, No. 9, pp. 2323-2326 (May 2011).

[21]. Z. G. Lu, J. R. Liu, C. Y. Song, J. Webber, Y. Mao, S. D. Chang, H. P. Ding, P. J. Poole, P. J. Barrios, D. Poitras, S. Janz, and M. O'Sullivan, "High performance InAs/inP quantum dot 34.462-GHz C-band coherent comb laser module," Optics Express 26 (2), 2160-2167 (January 2018).

[22]. Z. G. Lu, J. R. Liu, P. J. Poole, C. Y. Song, and S. D. Chang, "Ultra-narrow linewidth quantum dot coherent comb lasers with self-injection feedback locking," Optics Express 26 (9), 11909-11914 (April 2018).

[23]. Youxin Mao, Jiaren Liu, Zhenguo Lu, Chunying Song and Philip Poole, "Ultra-Low Timing Jitter of Quantum Dash Semiconductor Comb Lasers with Self-Injection Feedback Locking", IEEE Journal of Selected Topics in Quantum Electronics, Vol. 25, No. 6, 1900607(November/December 2019).

[24]. M. Rahim, K. Zeb, Z. G. Lu, G. Pakulski, J. R. Liu, P J. Poole, C. Y. Song, P. P. Barrios, W. H. Jiang, and X. P. Zhang, "Monolithic InAs/InP quantum dash dual-wavelength DFB laser with ultra-low noise common cavity modes for millimeter-wave applications", Optics Express 27 (24), 35368-35375 (Nov. 25, 2019).

[25]. K. Zeb, Z. G. Lu, J. R. Liu, M. Rahim, G. Pakulski, P. J. Poole, Y. X. Mao, C. Y. Song, P. Barrios, W. H. Jiang, and X. P. Zhang, "Photonic Generation of Spectrally Pure Millimeter-Wave Signals for 5G Applications", The Proceedings of 2019 International Topical Meeting on Microwave Photonics (MWP), Ottawa, ON, Canada (Oct. 7-10, 2019).

[26]. Youxin Mao, Zhenguo Lu, Jiaren Liu, Philip Poole, and Guocheng Liu, "Pulse Timing Jitter Estimated From Optical Phase Noise In Mode-lock Semiconductor Quantum Dash Lasers," IEEE Journal of Lightwave Technology, May 25, 2020 (Published date).

The invention claimed is:

1. A method for down-conversion of high frequency signals for a communication system comprising millimeter-waves (mm-waves), the method comprising the steps of:

with a quantum dot millimeter-wave laser (QD MWL) source, generating at least one optical signal comprising of a plurality of optical channels;

selecting the at least two optical channels comprising a first optical channel and a second optical channel; wherein the second optical channel is at least one local oscillator signal;

modulating the first optical channel with an incoming radio frequency signal having a first high frequency (GHz) and generating at least one modulated optical signal;

beating the at least one modulated optical signal with the second optical channel to generate an IF or baseband signal;

converting the IF or baseband signal into a first electrical signal having a first frequency, and converting the first electrical signal with the first frequency into a second electrical signal having a second frequency, wherein the first frequency is greater than the second frequency, wherein the second frequency is within the processing bandwidth of a traditional analog to digital converter (ADC);

the analog to digital converter (ADC) for receiving and converting the second electrical signal into a digital signal;

processing the digital signal to generate a digital output; whereby the least one high frequency RF signal is down-converted into the digital signal.

2. The method of claim 1, further comprising the step of selecting a frequency spacing between a first wavelength of the first optical channel and a second wavelength of the second optical channel.

3. The method of claim 1, wherein the second electrical signal comprises I and Q baseband signals.

4. A method for high RF frequency up-conversion for a communication system comprising millimeter-waves (mm-waves), the method comprising the steps of:

with a quantum dot multi-wavelength laser (QD MWL) source, generating at least one optical signal comprising of a plurality of optical channels;

selecting the at least two optical channels comprising a first optical channel and a second optical channel; wherein the second optical channel is at least one local oscillator signal;

modulating the first optical channel with a digital signal having a predetermined baud rate and generating at least one modulated optical signal;

multiplexing the at least one modulated optical signal and the second optical signal to generate a multiplexed optical signal containing data and LO signals;

beating the at least one modulated data signal and the at least one local oscillator signal on at least one first photodetector to generate at least one radio frequency (RF) signal;

amplifying the at least one radio frequency (RF) signal;

transmitting the at least one radio frequency (RF) signal; whereby the least one data signal is up-converted into an RF signal.

5. The method of claim 4, further comprising the step of selecting a frequency spacing between a first wavelength of the first optical channel and a second wavelength of the second optical channel.

6. The method of claim 5, wherein the at least one RF signal is found in at least one of a K-band, Ka-band, V-band, W-band, D-band, including 3GPP NR FR2 bands or even a frequency band in the THz range.

7. A photonic down-conversion system for high frequency communication system comprising millimeter-waves (mm-waves), the down-conversion system comprising:

a quantum dot multi-wavelength laser (QD MWL) source for generating at least one optical signal comprising a plurality of optical channels;

a demultiplexer for selecting at least two optical channels comprising a first optical channel and a second optical channel; wherein the second optical channel is at least one local oscillator signal;

an optical modulator for modulating the first optical channel with an incoming radio frequency signal having a first high frequency (GHz) and generating at least one modulated optical signal;

a multiplexer for combining the at least one modulated optical signal with the second optical channel;

at least one photodetector for beating the at least one modulated optical signal with the second optical channel baseband signal to generate an IF or baseband signal being a first electrical signal having a first frequency;

an analog to digital converter and a digital signal processing system (DSP) for converting the first electrical signal with the first frequency into a second electrical signal having a second frequency, wherein the first frequency is greater than the second frequency, wherein the second frequency is within the processing bandwidth of a traditional analog to digital converter (ADC);

converting the second electrical signal into a digital signal; and processing the digital signal to generate a digital output; whereby the least one high frequency RF signal is down-converted into the digital signal.

8. A photonic up-conversion system for a high frequency communication system comprising millimeter-waves (mm-waves), the up-conversion system comprising:

a quantum dot multi-wavelength laser (QD MWL) source for generating at least one optical signal comprising of a plurality of optical channels;

a demultiplexer selecting the at least two optical channels comprising a first optical channel and a second optical channel; wherein the second optical channel is at least one local oscillator signal;

a modulator for modulating the first optical channel with a digital signal having a predetermined baud rate and generating at least one modulated optical signal;

a multiplexer for multiplexing the at least one modulated optical signal and the second optical channel to generate a multiplexed optical signal containing data and LO signals;

at least one first photodetector for beating the at least one modulated data signal and the at least one local oscillator signal to generate at least one radio frequency (RF) signal;

an amplifier for amplifying the at least one radio frequency (RF) signal;

at least one antenna for transmitting the at least one radio frequency (RF) signal; whereby the least one data signal is up-converted into an RF signal.

* * * * *